United States Patent [19]
Bosworth

[11] 3,783,722
[45] Jan. 8, 1974

[54] INTERNAL BEAD TRIMMERS
[75] Inventor: Clive James Arthur Bosworth, Kettering, England
[73] Assignee: British Steel Corporation, London, England
[22] Filed: Aug. 28, 1972
[21] Appl. No.: 284,080

[30] Foreign Application Priority Data
Sept. 21, 1971 Great Britain.................. 44,019/71

[52] U.S. Cl............................ 83/1, 90/15, 90/24 B
[51] Int. Cl............................................. B26d 3/00
[58] Field of Search..................... 90/15, 24 B; 83/1

[56] References Cited
UNITED STATES PATENTS
3,618,463  11/1971  Briney et al. ....................... 90/15 X
3,420,143  1/1969  Nance................................ 90/24 B
2,714,338  8/1955  Nance................................ 90/24 B Primary Examiner—Andrew R. Juhasz
Assistant Examiner—W. D. Bray
Attorney—Bacon & Thomas

[57] ABSTRACT

An internal bead trimmer for removing the internal bead formed in the production of welded metal tube, in which the trimmer is mountable for relative axial movement within a tube. The trimmer includes: a bead cutting member; a measuring jet orifice carried by the trimmer downstream of the bead cutting member, said measuring jet orifice being connectable to a source of fluid pressure; and means for enabling the fluid pressure at the outlet of the measuring jet to be sensed; said orifice being so arranged and disposed that in use it follows the path of the cutting member at a predetermined spacing from the internal tube wall and directed at the weld line.

13 Claims, 3 Drawing Figures

PATENTED JAN 8 1974
3,783,722
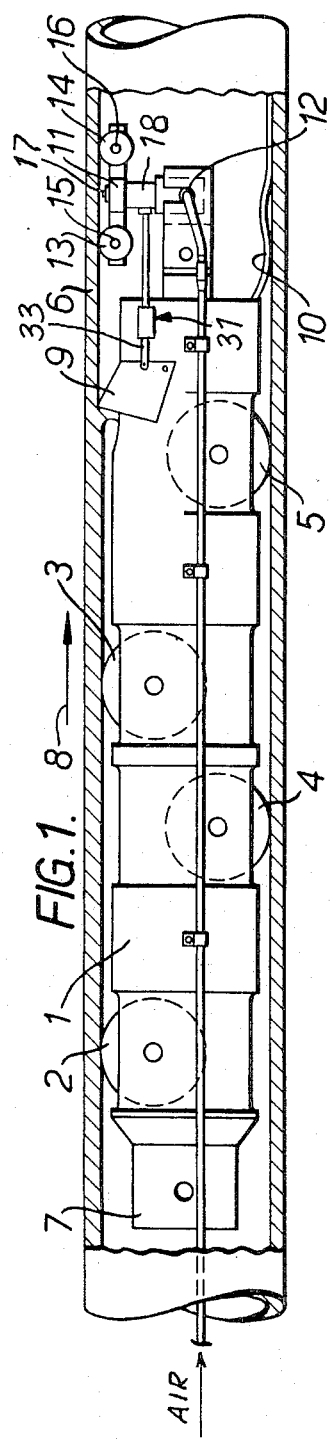
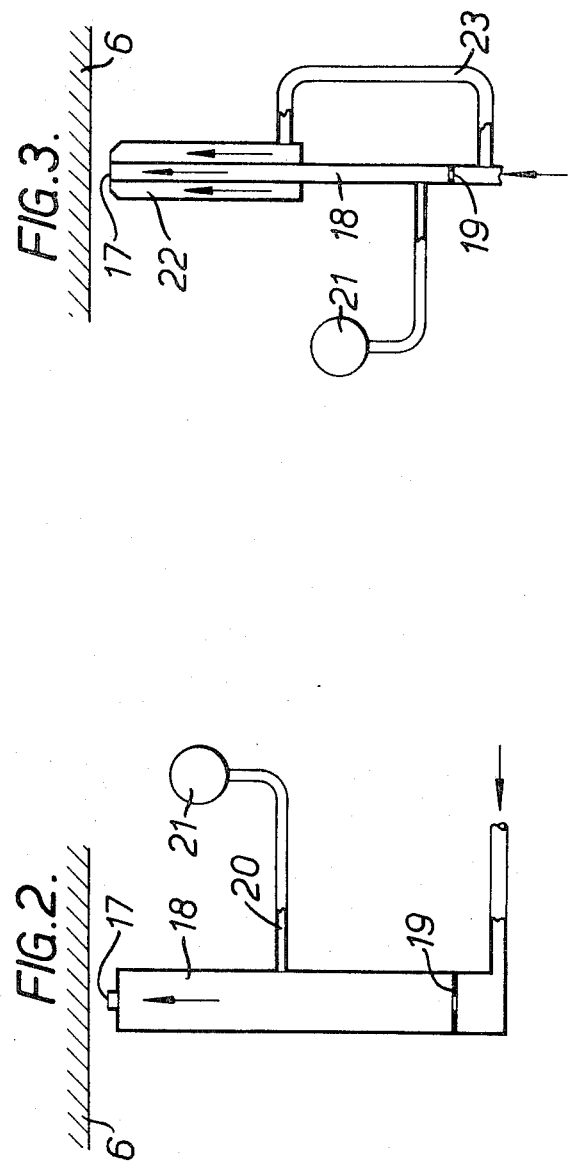

INTERNAL BEAD TRIMMERS

This invention relates to internal bead trimmers for trimming the internal bead of excess metal formed along the weld line in the production of electric longitudinally welded tube.

In the manufacture of electric welded tube, the electrically heated longitudinal edges of metal strip are forced together to form a seam weld, and in so doing a certain amount of metal is squeezed inwardly and outwardly of the tube to form ridges or beads which vary in thickness depending on the tube size, the wall thickness, and welding conditions. To make an acceptable final tube product it is necessary that these beads be accurately and evenly trimmed off flush with the internal and external surfaces of the tube.

In the case of removal of the internal bead, it is known to provide a cutting tool or trimmer mounted on a trimmer head assembly located firmly on wheels in the bore of the tube.

It is an object of the present invention to provide means for controlling or monitoring the operation of such a trimmer.

According to the present invention there is provided an internal bead trimmer for removing the internal bead formed in the production of welded metal tube, said trimmer being mountable for movement within a tube and including a bead cutting member; a measuring jet orifice carried by the trimmer downstream of the bead cutting member, said measuring jet orifice being connectable to a source of fluid pressure; and means for enabling the fluid pressure at the outlet of the measuring jet orifice to be sensed; said orifice being so arranged and disposed that in use it follows the path of the cutting member at a predetermined spacing from the internal tube wall and directed at the weld line.

The invention is based upon the fact that, assuming a constant pressure fluid supply, the pressure at the orifice outlet will vary in dependence on the spacing of the orifice outlet from the internal tube wall within a certain range of that spacing, so that if the radial location of the orifice within the metal tube generally is kept constant, variations in the orifice outlet pressure are dependent on the amount of bead remaining along the weld line after trimming. Hence the efficiency, consistency and effectiveness of the trimming operation can be monitored.

Means may be provided for adjusting the position of the cutting member for optimum performance. Such means may be arranged for use during operation of the trimmer in dependence on the measuring orifice pressure readings and may comprise a mechanical linkage.

A second, annular, orifice may be provided surrounding the measuring jet orifice, the second orifice being subjected, in use, to a higher fluid pressure than the measuring jet orifice, such that laminar flow exists in the fluid streams leaving the orifices whereby the two streams do not mix. By this means the inner measuring stream is still radially restricted beyond the end of its orifice outlet by the annular jet encircling it, so that effective working of the arrangement is possible at greater spacing between the measuring orifice and the tube wall than would be otherwise possible. Hence the danger of orifice being hit and damaged by an excessively protruding portion of the internal bead or other inward protrusion is diminished compared with the case where only a single, measuring, orifice is used.

The inner measuring orifice and the outer annular orifice may be connectable to a single compressed fluid supply pipe, the differential pressure therebetween in use, being provided by means, for example, of an apertured pressure reducing baffle in an inlet pipe leading to at least one of the orifices.

The fluid used for the jet orifice or orifices may be air.

In order that the invention may be more fully understood two embodiments thereof will now be described by way of example with reference to the accompanying drawings in which:

FIG. 1 is a diagrammatic side elevation of part of one form of bead trimmer according to the invention;

FIG. 2 is a diagrammatic representation of the pneumatic arrangement of the embodiment of FIG. 1; and FIG. 3 is a diagrammatic representation of the pneumatic arrangement of an alternative embodiment of the invention.

Referring now to FIGS. 1 and 2, it will be seen that the trimmer comprises a head assembly or main body 1 mounted on four wheels 2, 3, 4 and 5 for movement relative to a welded tube 6. In practice the trimmer is held stationary by means of an elongate rod (not shown) inserted into the tube from upstream of the tube welding station and connected to the trimmer by means of lug 7, whilst the welded tube is continuously moved past the trimmer in the direction of arrow 8 to further operational stations whereat it is cut into required lengths and subjected to further known finishing processes.

The wheels 2 and 3 are provided with peripheral grooves (not shown) for engaging the internal bead formed along the tube weld line, so that the trimmer is radially aligned within the tube 6.

The trimmer carries an adjustable cutting member 9 which engages with and removes the internal bead 10 which, after being cut, passes through the body 1 and along the inside of the tube 6 to be removed at the next operating station where the tube is cut into required lengths.

Carried behind the main body 1 of the trimmer is a bogey member 11 which is mounted for free rotation on a bearing 12 carried by the body 1, and has two pairs of wheels (two only shown) 13 and 14, each pair being mounted on axles 15 and 16 respectively. Mounted on the bogey 11 between the wheels 13 and 14 is a measuring jet orifice 17 directed toward the tube weld line (i.e., at the remnant of the cut bead) and spaced therefrom by a distance of up to about 0.015 inch or 0.020 inch. The orifice 17 is connected by a pipe 18 to an air source (not shown) and the arrangement is such that air is emitted from the orifice at a pressure of the order of 1 p.s.i.

The pneumatic monitoring arrangement of the trimmer of FIG. 1 is shown in FIG. 2.

Air from a source (not shown) passes through a pressure reducing baffle 19, and then towards the pipe 18. A branch pipe 20 is connected to a pressure gauge 21 which measures variations of pressure in the pipe 18. Within the range of spacing of the orifice 17 from the weld line along the tube wall 6 used in the trimmer, such pressure variations are dependent on variations in that spacing. Hence by suitable calibration of the pressure gauge 21, it is possible to monitor from the gauge whether or not the bead is being correctly trimmed.

The arrangement shown in FIGS. 1 and 2 is in many instances completely satisfactory. However the very close spacing of the orifice 17 from tube wall can involve problems in some cases in that inwardly directed protrusions or similar blemishes can possibly hit and damage the orifice.

The arrangement shown in FIG. 3 reduces this particular problem.

In this embodiment, in addition to the measuring jet orifice 17 there is provided a further annular orifice 22 surrounding the measuring orifice. As before, the measuring orifice is connected to a pressure gauge 21 and to an air supply via a pressure reducing baffle. In this case however the air supply is also connected via a pipe 23 to the annular orifice 22. In practice, the pressure of the annular jet is of the order of 4. p.s.i., and of the inner jet about 1 p.s.i. It is found that the two jets maintain laminar flow and do not mix, and the annular jet acts as a constraining cylinder around the inner jet so that the orifice 17 may be spaced further from the inner tube wall (more particularly from the weld line) with the dependence of inner jet pressure variation on spacing still holding true.

Means, generally indicated by the reference numeral 31, for adjusting the position of the cutting member for optimum performance during operation of the trimmer in dependence on the measuring orifice pressure readings, may comprise a mechanical linkage 33. In this case a spacing of up to about 0.100 inch is possible.

I claim:

1. An internal bead trimmer for removing the internal bead formed in the production of welded metal tube, said trimmer being mountable for relative axial movement within a tube, and said trimmer including: a bead cutting member; a measuring jet orifice carried by the trimmer downstream of the bead cutting member, said measuring jet orifice being connectable to a source of fluid pressure; and means for enabling the fluid pressure at the outlet of the measuring jet to be sensed; said orifice being so arranged and disposed that in use it follows the path of the cutting member at a predetermined spacing from the internal tube wall and directed at the weld line.

2. A bead trimmer as claimed in claim 1 in which the measuring jet orifice is connectable to a pressure gauge.

3. A bead trimmer as claimed in claim 1 including means for adjusting the position of the cutting member.

4. A bead trimmer as claimed in claim 3 in which the means for adjusting the position of the cutting member is operable in use of the trimmer.

5. A bead trimmer as claimed in claim 1 in which the measuring jet orifice is connectable to a supply of compressed air.

6. A bead trimmer as claimed in claim 1 in which the orifice is mounted on a wheeled bogey carried behind the cutting member.

7. An internal bead trimmer for removing the internal bead formed in the production of welded metal tube, said trimmer being mountable for relative axial movement within a tube, and said trimmer including: a bead cutting member; a measuring jet orifice and a separate annular orifice surrounding the measuring jet orifice, said measuring jet orifice and said annular orifice being each connectable to a source of fluid pressure, and the annular orifice being arranged to be subjected, in use, to a higher fluid pressure than the measuring jet orifice such that laminar flow exists in the fluid streams leaving the orifices whereby the two streams do not mix; and means for enabling the fluid pressure at the outlet of the measuring jet orifice to be sensed; said orifices being so arranged and disposed that in use they follow the path of the cutting member at a predetermined spacing from the internal tube wall and directed at the weld line.

8. A bead trimmer as claimed in claim 7 in which the measuring orifice and the annular orifice are connectable to a single compressed fluid supply pipe, differential pressure therebetween in use, being provided by means of an apertured pressure reducing baffle in an inlet pipe leading to at least one of the orifices.

9. A bead trimmer as claimed in claim 7 in which the measuring jet orifice is connectable to a pressure gauge.

10. A bead trimmer as claimed in claim 7 including means for adjusting the position of the cutting member.

11. A bead trimmer as claimed in claim 10 in which the means for adjusting the position of the cutting member is operable in use of the trimmer.

12. A bead trimmer as claimed in claim 7 in which the measuring jet orifice is connectable to a supply of compressed air.

13. A bead trimmer as claimed in claim 7 in which the orifices are mounted on a wheeled bogey carried the cutting member.

* * * * *